(12) United States Patent
Ma

(10) Patent No.: US 9,836,094 B2
(45) Date of Patent: Dec. 5, 2017

(54) DISPLAY METHOD AND ELETRONIC DEVICE FOR LOCATION/POSITION SENSING AND DISPLAYING RELATION INFORMATION WHILE REDUCING POWER CONSUMPTION

(71) Applicant: Lenovo (Beijing) Co., Ltd., Haidian District, Beijing (CN)

(72) Inventor: Wenchao Ma, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 108 days.

(21) Appl. No.: 14/187,504

(22) Filed: Feb. 24, 2014

(65) Prior Publication Data

US 2014/0240224 A1 Aug. 28, 2014

(30) Foreign Application Priority Data

Feb. 25, 2013 (CN) .......................... 2013 1 0058884

(51) Int. Cl.
*G06F 1/16* (2006.01)
*G06F 1/32* (2006.01)
*G06F 3/01* (2006.01)
*G06F 3/03* (2006.01)

(52) U.S. Cl.
CPC .......... *G06F 1/1694* (2013.01); *G06F 1/3206* (2013.01); *G06F 1/3234* (2013.01); *G06F 3/011* (2013.01); *G06F 3/0304* (2013.01)

(58) Field of Classification Search
None
See application file for complete search history.

(56) References Cited

U.S. PATENT DOCUMENTS

| 2007/0106457 A1* | 5/2007 | Rosenberg | .................... | 701/200 |
| 2010/0174421 A1* | 7/2010 | Tsai et al. | ..................... | 700/302 |
| 2010/0328344 A1* | 12/2010 | Mattila | ................. | G06F 1/1626 |
| | | | | 345/633 |
| 2011/0071757 A1* | 3/2011 | Lee | ........................ | G01C 21/20 |
| | | | | 701/532 |
| 2011/0199479 A1* | 8/2011 | Waldman | .......... | G01C 21/3602 |
| | | | | 348/116 |
| 2012/0010811 A1* | 1/2012 | Hamada | ................ | G01C 21/32 |
| | | | | 701/468 |
| 2013/0006573 A1* | 1/2013 | Brunner | ................. | G01C 17/38 |
| | | | | 702/141 |
| 2013/0321472 A1* | 12/2013 | Piemonte | ........... | G01C 21/3664 |
| | | | | 345/672 |

* cited by examiner

*Primary Examiner* — Liliana Cerullo
*Assistant Examiner* — Donna Lui
(74) *Attorney, Agent, or Firm* — Brinks Gilson & Lione; G. Peter Nichols

(57) ABSTRACT

A display method and an electronic device are described. The display method is applied in an electronic device that includes a display unit and at least one sensing unit. The method includes obtaining first sensing data by a first sensing unit; determining first display information according to the first sensing data; judging whether a predetermined condition is met or not to obtain a judgment result; and selecting a first mode or a second mode to be used to determine a display position of the first display information on the display unit according to the judgment result, wherein the first mode is different from the second mode; and displaying the first display information at the display position.

15 Claims, 3 Drawing Sheets

DISPLAY METHOD AND ELETRONIC DEVICE FOR LOCATION/POSITION SENSING AND DISPLAYING RELATION INFORMATION WHILE REDUCING POWER CONSUMPTION

BACKGROUND

This application claims priority to Chinese patent application No. 201310058884.1 filed on Feb. 25, 2013, the entire contents of which are incorporated herein by reference.

The present invention relates to an electronic device, and more specifically, to a display method and an electronic device.

At present, computer vision technology has been rapidly developed and applied in various fields. For example, many applications need to acquire position, attitude and the like of a user by one or more sensors in the consumer electronics field; and a display position of display information to be displayed is determined by using the position, attitude and the like of the user.

However, in such application, the display position of the display information is generally determined in a single mode, regardless of a using state of the user. For example, if the user always determines the display position of the display information with high accuracy, it shall lead to a lot of computational overhead at each computation, so the user cannot bear the power consumption or time delay of the electronic device, resulting in poor user experience. If the user always determines the display position of the display information with low accuracy, it shall result in a greater error of the display position of the display information, which also affects the user experience.

It is thus desirable to provide a display method and an electronic device, which can select different modes according to the using state of the user to determine the display position of the display information, so as to improve the user experience.

SUMMARY

According to one embodiment of the present invention, there is provided a display method, applied in an electronic device, which includes a display unit and at least one sensing unit, and the method comprises:

Obtaining first sensing data by a first sensing unit in the at least one sensing unit;

Determining first display information according to the first sensing data;

Judging whether a predetermined condition is met or not to obtain a judgment result;

Selecting a first mode or a second mode to be used to determine a display position of the first display information on the display unit according to the judgment result, wherein the first mode is different from the second mode; and Displaying the first display information at the display position.

Preferably, the first mode is a mode with first complexity; the second mode is a mode with second complexity; and the first complexity is lower than the second complexity.

Preferably, said selecting a first mode or a second mode to be used to determine a display position of the first display information on the display unit according to the judgment result includes:

Determining the display position of the first display information on the display unit in the first mode, when a first condition is met; and Determining the display position of the first display information on the display unit in the second mode, when the first condition is not met.

Preferably, the first condition includes that a variation of each sensing data obtained by a second sensing unit in the at least one sensing unit does not exceed a respective predetermined threshold value.

Preferably, the first condition includes that the display position of the first display information on the display unit is not determined for the first time; or the first condition includes that a time period from the last time for determining the display position of the first display information on the display unit in the second mode does not exceed a predetermined time period.

Preferably, said selecting a first mode or a second mode to be used to determine a display position of the first display information on the display unit according to the judgment result includes:

Determining the display position of the first display information on the display unit in the first mode, when a first condition is met;

Determining the display position of the first display information on the display unit in the second mode, when a second condition is met; and Determining the display position of the first display information on the display unit in the second mode, when the first condition and the second condition are met at the same time.

Preferably, the first condition includes that a variation of each sensing data obtained by a second sensing unit in the at least one sensing unit does not exceed a respective predetermined threshold value; and the second condition includes that a time period from the last time for determining the display position of the first display information on the display unit in the second mode exceeds a predetermined time period.

Preferably, the first condition includes that a time period from the last time for determining the display position of the first display information on the display unit in the second mode does not exceed a predetermined time period; and the second condition includes that a variation of each sensing data obtained by a second sensing unit in the at least one sensing unit exceeds a respective predetermined threshold value.

Preferably, said determining the display position of the first display information on the display unit in the first mode includes:

Processing first initial data to obtain the display position of the first display information on the display unit, wherein the first initial data includes display position data of the first display information and each sensing data obtained by a second sensing unit in the at least one sensing unit; and Said determining the display position of the first display information on the display unit in the second mode includes:

Processing second initial data to obtain the display position of the first display information on the display unit, wherein the second initial data is data not including the display position data of the first display information.

Preferably, said processing first initial data to obtain the display position of the first display information on the display unit includes:

Determining the display position of the first display information on the display unit according to a current display position of the first display information and one or more of the sensing data obtained by the second sensing unit in the at least one sensing unit; and Wherein said processing second initial data to obtain the display position of the first display information on the display unit includes:

Determining the display position of the first display information on the display unit according to the sensing data exceeding to a predetermined threshold value in the sensing data obtained by the second sensing unit in the at least one sensing unit.

Preferably, the electronic device includes an image acquisition unit; and the method further includes:

Obtaining second display information by the image acquisition unit after the first display information is displayed at the display position, and Displaying the second display information on the display unit.

Preferably, said determining the display position of the first display information on the display unit in the second mode includes:

Performing an image recognition processing on the second display information, and directly determining the display position of the first display information on the display unit according to a result of the image recognition processing.

Preferably, the first sensing unit is a spatial parameter sensor; the first sensing data obtained by the first sensing unit is sensing data regarding a spatial parameter of the electronic device; and Wherein, said judging whether a predetermined condition is met or not to obtain a judgment result includes:

Judging whether second sensing data obtained by a second sensing unit in the at least one sensing unit meets the predetermined condition or not to obtain the judgment result.

Preferably, the first sensing data includes geographic position data and attitude data of the electronic device, the attitude data including an orientation and a dip angle of the electronic device; and Wherein, said selecting a first mode or a second mode to be used to determine a display position of the first display information on the display unit according to the judgment result includes:

Selecting the first mode or the second mode to be used to determine the display position of the first display information on the display unit by using the second sensing data, according to the judgment result.

According to another embodiment of the present invention, there is provided an electronic device, which comprises:

A display unit;

At least one sensing unit;

An acquisition unit, for acquiring first sensing data by a first sensing unit in the at least one sensing unit.

A determining unit, for determining first display information according to the first sensing data;

A judging unit, for judging whether a predetermined condition is met or not to obtain a judgment result;

A selecting unit, for selecting a first mode or a second mode to be used to determine a display position of the first display information on the display unit according to the judgment result, wherein the first mode is different from the second mode; and A display control unit, for controlling to display the first display information at the display position.

Preferably, the first condition includes that a variation of each sensing data obtained by a second sensing unit in the at least one sensing unit does not exceed a respective predetermined threshold value.

Preferably, the first condition includes that the display position of the first display information on the display unit is not determined for the first time; or the first condition includes that a time period from the last time for determining the display position of the first display information on the display unit in the second mode does not exceed a predetermined time period.

Preferably, the electronic device further includes:

An image acquisition unit, for acquiring second display information;

Wherein, the display control unit displays the second display information on the display unit after displaying the first display information at the display position.

Therefore, the display method and electronic device according to the embodiments of the present invention can determine the display position of the display information by selecting different modes according to the using state of the user so as to improve the user experience.

DETAILED DESCRIPTION

The embodiments of the present invention will be described in detail now with reference to the attached drawings.

<First Embodiment>

Figure 1:
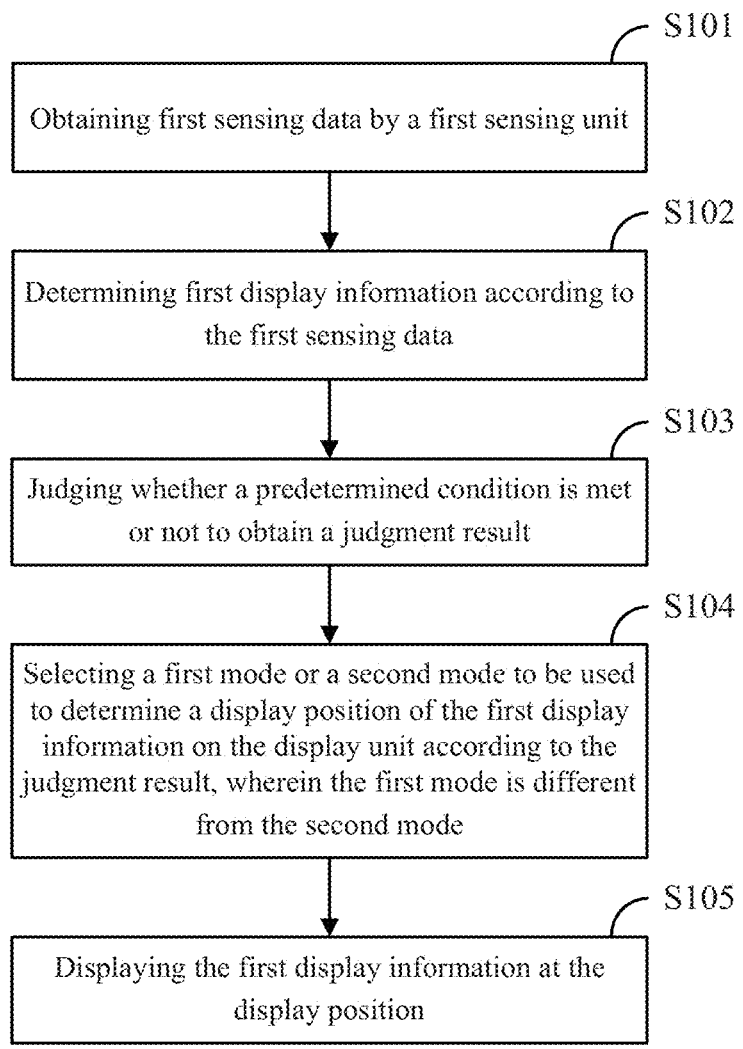
FIG. 1 a flowchart illustrating a display method according to a first embodiment of the present invention.

FIG. 1 is a flowchart illustrating a display method according to the first embodiment of the present invention. The display method according to the first embodiment is applied in an electronic device; and the electronic device includes a display unit and at least one sensing unit. The electronic device can be any electronic device, such as a smart phone, a tablet PC, a personal digital assistant (PDA) and the like.

The method comprises the following steps.

At Step S101, first sensing data is obtained by a first sensing unit in the at least one sensing unit.

In the step, the first sensing data is obtained by the first sensing unit in the at least one sensing unit of the electronic device. The sensing unit of the electronic device, for example, includes a position sensor (such as GPS), an attitude sensor (such as a geomagnetic sensor for determining the orientation of the user and the dip angle relative to the ground), etc.

Respective sensing units of the electronic device can obtain multiple sensing data, such as the position of the user, the orientation of the user, the dip angle of the electronic device relative to the ground, etc. In the embodiment, it is also possible to obtain only one sensing data to determine the display information. For example, it is assumed that obtaining the first sensing data by the first sensing unit in the step is obtaining the geographic position data of the user by the GPS position sensor. Certainly, obtaining the first sensing data by the first sensing unit in this step can also be obtaining the orientation of the user and the like by the geomagnetic sensor.

At Step S102, first display information is determined according to the first sensing data.

In the step, the first display information to be displayed is determined according to the first sensing data obtained in step S101. For example, when obtaining the first sensing data by the first sensing unit is obtaining the geographic position data of the user by the GPS position sensor, it can be determined that the first display information is the information about the current position. The information, for example, can comprise district, street, name of nearby landmark, icon pointing to destination and the like of the current position. Or, when obtaining the first sensing data by the first sensing unit is obtaining the orientation of the user by the geomagnetic sensor, for example, it can be determined that the first display information is a compass icon, which indicates the orientation of the user with the direction of the compass, or may be message information indicating the orientation of the user, etc.

At Step S103, it is judged whether a predetermined condition is met or not to obtain a judgment result.

In the step, it is judged whether a predetermined condition set in advance is met or not, and a judgment result is obtained. For example, the predetermined condition set in advance can be: whether a variation of each sensing data obtained by the at least one sensing unit exceeds a respective predetermined threshold value, whether it is the first time that the display position of the first display information on the display unit is determined, or a time period from the last time for determining the display position of the first display information on the display unit in a second mode does not exceed a predetermined time period, etc.

At Step S104, a first mode or the second mode is selected to be used to determine a display position of the first display information on the display unit according to the judgment result; and the first mode is different from the second mode.

In the step, according to the judgment result obtained by the judgment in step S103, the first mode or the second mode is selected to be used to determine the display position of the first display information on the display unit, wherein the first mode is different from the second mode.

That is to say, in the step, different from determining the display position of the display information on the display unit in a single mode in the prior art, in the display method according to the embodiment of the present invention, the first mode or the second mode which are different from each other is selectively adopted to determine the display position of the first display information on the display unit, so as to provide greater flexibility.

At Step S105, the first display information is displayed at the display position.

In the step, the first display information determined in step S102 is displayed at the determined display position.

In addition, the first mode is a mode with first complexity; the second mode is a mode with second complexity; and the first complexity is lower than the second complexity.

In one embodiment, when the computation complexity is high, for example, when map data needs to be obtained according to the geographical location information and image recognition algorithm needs to be executed, long computation time is required, so the user cannot bear the computation time delay thus caused.

In another embodiment, when the computation complexity is high, for example, when map data needs to be obtained according to the geographical location information and image recognition algorithm needs to be executed, a large amount of computation is required, so the user cannot bear the computation power consumption thus caused.

That is to say, in the display method according to the embodiment of the present invention, the first mode with low complexity or the second mode with high complexity is selectively adopted according to whether the predetermined condition is met or not. For example, the second mode can be used under the condition that high accuracy is required such that the position of the display information on the display unit can be determined precisely, thereby improving the user experience. It requires more computation resource, computation time and power consumption to determine the position of the display information on the display unit with high accuracy.

The first mode with low complexity can be used when high accuracy is not required or the current display position is already determined with high accuracy, which thus can reduce the power consumption and computation time, thus improving user experience.

Specifically, in one embodiment, the step in which the first mode or the second mode is selected to be used to determine a display position of the first display information on the display unit according to the judgment result includes: determining the display position of the first display information on the display unit in the first mode, when a first condition is met; and determining the display position of the first display information on the display unit in the second mode, when the first condition is not met.

That is to say, in such case, one measurement parameter is used for carrying out judgment to obtain the judgment result. The measurement parameter can be a variation of the sensing data obtained by the sensing unit(s), or an interval time between processings in different modes, etc.

For example, when the variation of each sensing data obtained by the second sensing unit in the at least one sensing unit does not exceed the predetermined threshold value, it is decided that the first condition is met.

It should be noted that the second sensing unit can be the same with, or different from, or partially same with the first sensing unit.

In one embodiment, for example, when the position information of the user is obtained by the GPS position sensor (the first sensing unit), and if the variation of the position information obtained by the GPS position sensor (the second sensing unit) does not exceed one meter, it is decided that the first condition is met. At this time, the position of the display information on the display unit can be determined in the first mode with low complexity. On the other hand, if the variation of the position information obtained by the GPS position sensor (the second sensing unit) exceeds one meter, it is decided that the first condition is not met. At this time, the position of the display information on the display unit needs to be determined in the second mode with high complexity. In this case, the first sensing unit and the second sensing unit are both GPS position sensor.

In another embodiment, for example, when the position information of the user is obtained by the GPS position sensor (the first sensing unit), and if the variation of the user's orientation obtained by the geomagnetic sensor (the second sensing unit) does not exceed 5°, it is decided that the first condition is met. At this time, the position of the display information on the display unit can be determined in the first mode with low complexity. On the other hand, if the variation of the user's orientation obtained by the geomagnetic sensor (the second sensing unit) exceeds 5°, it is decided that the first condition is not met. At this time, the position of the display information on the display unit can be determined in the second mode with high complexity. In this case, the first sensing unit is the GPS position sensor, and the second sensing unit is the geomagnetic sensor, both being different from each other.

In another embodiment, for example, when the position information of the user is obtained by the GPS position sensor (the first sensing unit), and if the variation of the user's orientation obtained by the geomagnetic sensor (the second sensing unit) does not exceed 5° and the variation of the position information obtained by the GPS position sensor (the second sensing unit) does not exceed one meter, it is decided that the first condition is met. At this time, the position of the display information on the display unit can be determined in the first mode with low complexity. On the other hand, if the variation of the user's orientation obtained by the geomagnetic sensor (the second sensing unit) exceeds 5° or the variation of the position information obtained by the GPS position sensor (the second sensing unit) exceeds one meter, it is decided that the first condition is not met. At this time, the position of the display information on the display unit needs to be determined in the second mode with high complexity. Under such circumstance, the first sensing unit is the GPS position sensor, and the second sensing unit is the GPS position sensor and the geomagnetic sensor, both being the same partially.

Alternatively, for example, when the display position of the first display information on the display unit is determined for the first time, it is decided that the first condition is not met. At this time, the position of the display information on the display unit can be determined in the second mode with high complexity. When it is not the first time to determine the display position of the first display information on the display unit, it is decided that the first condition is met. At this time, the position of the display information on the display unit can be determined in the first mode with low complexity.

Or, when the time period from the last time for determining the display position of the first display information on the display unit in the second mode does not exceed the predetermined time period, it is decided that the first condition is met. At this time, the position of the display information on the display unit can be determined in the first mode with low complexity. On the other hand, when the time period from the last time for determining the display position of the first display information on the display unit in the second mode exceeds the predetermined time period, it is decided that the first condition is not met. At this time, the position of the display information on the display unit can be determined in the second mode with high complexity. That is to say, the position of the display information on the display unit needs to be re-determined in the second mode with high complexity.

For example, in one embodiment, when the time period from the last time for determining the display position of the first display information on the display unit in the second mode exceeds 5 minutes, it is decided that the first condition is not met. At this time, the position of the display information on the display unit can be determined in the second mode with high complexity.

In other embodiments, the step in which the first mode or the second mode is selected to be used to determine the display position of the first display information on the display unit according to the judgment result may include: determining the display position of the first display information on the display unit in the first mode, when a first condition is met; determining the display position of the first display information on the display unit in the second mode, when a second condition is met; and determining the display position of the first display information on the display unit in the second mode, when the first condition and the second condition are met at the same time.

That is to say, in such case, two measurement parameters are used for carrying out judgment to obtain the judging results. The measurement parameters can be a variation of the sensing data obtained by the sensing unit(s), and an interval time between processings in different modes.

For example, in one embodiment, the first condition includes that a variation of each sensing data obtained by a second sensing unit in the at least one sensing unit does not exceed a respective predetermined threshold value; and the second condition includes that the time period from the last time for determining the display position of the first display information on the display unit in the second mode exceeds the predetermined time period.

In such case, when the variation of each sensing data obtained by the second sensing unit in the at least one sensing unit does not exceed the respective predetermined threshold value, it is decided that the display position of the first display information on the display unit is determined in the first mode; and when the time period from the last time for determining the display position of the first display information on the display unit in the second mode exceeds the predetermined time period, the display position of the first display information on the display unit is determined in the second mode. In addition, when the variation of each sensing data obtained by the second sensing unit in the at least one sensing unit does not exceed the predetermined threshold value, and when the time period from the last time for determining the display position of the first display information on the display unit in the second mode exceeds the predetermined time period, then it is decided that the display position of the first display information on the display unit is determined in the second mode.

In another embodiment, the first condition includes that from the time period from the last time for determining the display position of the first display information on the display unit in the second mode does not exceed the predetermined time period; and the second condition includes that a variation of one of sensing data obtained by a second sensing unit in the at least one sensing unit exceeds a predetermined threshold value.

In such case, when the time period from the last time for determining the display position of the first display information on the display unit in the second mode does not exceed the predetermined time period, it is decided that the display position of the first display information on the display unit is determined in the first mode; and when the variation of any of sensing data obtained by the second sensing unit in the at least one sensing unit exceeds the predetermined threshold value, the display position of the first display information on the display unit is determined in the second mode. In addition, when the time period from the last time for determining the display position of the first display information on the display unit in the second mode does not exceed the predetermined time period, and when the variation of any of sensing data obtained by the second sensing unit in the at least one sensing unit exceeds the predetermined threshold value, then the display position of the first display information on the display unit is determined in the second mode.

The process of determining the display position of the first display information on the display unit in the first mode or the second mode is specifically described below.

Said determining the display position of the first display information on the display unit in the first mode includes: processing first initial data to obtain the display position of the first display information on the display unit, wherein the first initial data includes display position data of the first display information and each sensing data obtained by the at least one sensing unit.

Specifically, the first mode is the mode for determining the display position of the first display information on the display unit indirectly. In other words, the first mode is the mode for processing the first initial data to obtain the display position of the first display information on the display unit. The first initial data comprises the display position data of the first display information and each sensing data obtained by the second sensing unit in the at least one sensing unit. That is to say, the first initial data comprises the display position data for indicating the current display position of the first display information. For example, the first initial data can comprise the display position data of the first display information and the position data of the user obtained by the GPS sensor, or comprise the display position data of the first display information and the attitude data of the user obtained by the geomagnetic sensor.

When the first mode is adopted, as the current display position of the first display information is known, only the sensing data obtained by the second sensing unit is referred to, so less amount of computation and shorter time are required to process the data.

On the other hand, said determining the display position of the first display information on the display unit in the second mode includes: processing second initial data to obtain the display position of the first display information on the display unit, wherein the second initial data is data not including the display position data of the first display information.

Specifically, the second mode is the mode for determining the display position of the first display information on the display unit directly. In other words, the second mode is the mode for processing the second initial data to obtain the display position of the first display information on the display unit. The second initial data comprises each sensing data which is obtained by the second sensing unit in the at least one sensing unit and exceeds a respective threshold value. That is to say, the second mode is the mode for determining the display position of the first display information on the display unit directly according to each sensing data which is obtained by the second sensing unit in the at least one sensing unit and exceeds the respective threshold value. For example, in the second mode, the display position of the first display information on the display unit is determined according to the data which is obtained by the GPS position sensor in the at least one sensing unit and exceeds the predetermined threshold value. For example, the computation is carried out according to new GPS position data so as to determine the display position of the first display information on the display unit.

When the second mode is adopted, as computation is performed according to the data exceeding the predetermined threshold value, so as to obtain the display position of the display information; more amount of computation and longer time is required to process the data. That is to say, when the display position of the display information is directly calculated, more computation complexity is required to determine the display position of the display information because of no reference data.

In another embodiment, the electronic device can further comprise an image acquisition unit, such as a camera. So, the display method according to the embodiment can further comprise: obtaining second display information by the image acquisition unit after the first display information is displayed at the display position; and displaying the second display information on the display unit.

That is to say, when the electronic device is provided with the camera, the image data can be acquired by the camera and displayed on the display unit.

At this time, said determining the display position of the first display information on the display unit in the second mode includes: performing an image recognition processing on the second display information, and directly determining the display position of the first display information on the display unit according to a result of the image recognition processing.

That is to say, by performing image recognition processing on an image, such as recognizing the road in the image, the display position of the first display information on the display unit can be directly determined according to the result of image recognition processing. For example, an icon pointing to the destination or the like is displayed on the recognized road, etc.

In addition, in one embodiment, the first sensing data can comprise geographic position data; and the step in which the display position of the first display information on the display unit is determined according to the first sensing data includes: obtaining related map data according to the geographic position data, and determining the display position of the first display information on the display unit according to the display position of the display unit in the map data.

When the first sensing data is the geographic position data, the map data of the current position can be obtained from a server; and the display positions of information, such as district, street, name of landmark, icon pointing to destination and the like of the current position of the user on the display unit can be determined according to the obtained map data.

In addition, in one embodiment, the first sensing data comprises attitude data of the electronic device, which includes an orientation and a dip angle of the electronic device; and the step in which the display position of the first display information on the display unit is determined according to the first sensing data includes: determining the display position of the first display information on the display unit according to the orientation and/or the dip angle of the electronic device.

When the first sensing data is the attitude data (such as the orientation and/or the dip angle) of the electronic device, the display position of, for example, the information of the compass on the display unit can be determined according to the current orientation and/or the dip angle of the electronic device.

In addition, in one embodiment, the first sensing unit is a spatial parameter sensor; and the first sensing data obtained by the first sensing unit is sensing data regarding a spatial parameter of the electronic device.

The step S102 in which it is judged whether a predetermined condition is met or not to obtain a judgment result includes: judging whether the second sensing data obtained by the second sensing unit in the at least one sensing unit meets the predetermined condition or not to obtain the judgment result.

Specifically, it can be judged whether the second sensing data obtained by the second sensing unit in the at least one sensing unit exceeds a respective predetermined threshold value, etc.

As described above, the first sensing data includes the geographic position data and attitude data of the electronic device, the attitude data including the orientation and dip angle of the electronic device.

The step S103 in which the first mode or the second mode is selected to be used to determine the display position of the first display information on the display unit according to the judgment result includes: selecting the first mode or the second mode to be used to determine the display position of the first display information on the display unit by using the second sensing data, according to the judgment result.

Specifically, the first mode or the second mode is selected to be used to determine the display position of the first display information on the display unit by using the second sensing data, according to the geographic position data, orientation, dip angle and the like of electronic device.

The display method according to the embodiment of the present invention will be described in detail now with reference to FIG. 2 and FIG. 3.

Figure 2:
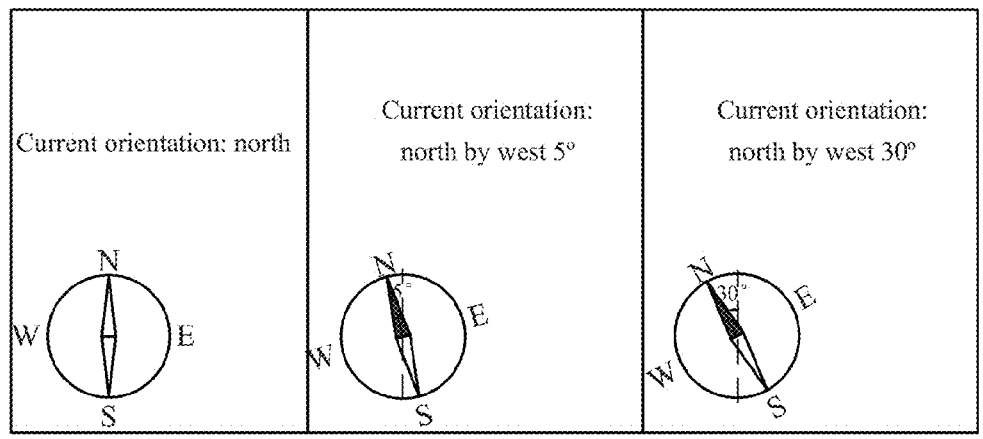
FIG. 2 is a first example illustrating an effect drawing of the display method according to the first embodiment of the present invention.

FIG. 2 is an effect drawing illustrating the determining of the display position of the compass on the display unit.

As shown in the left side of FIG. 2, when the initiated application is an compass application, if the geomagnetic sensor detects that the user faces toward the north, it is determined that a compass icon corresponds to the sensing data at this time. When it is determined that the display position of the compass icon is determined for the first time, the display position of the compass icon is determined in the second mode. That is to say, the compass icon is determined to point to the right above (i.e., the north) in the mode with high computation complexity. And then, the compass icon is displayed on the display unit, wherein the pointer of the compass points to the right above, and the message "current orientation: north" is correspondingly displayed.

On the other hand, as shown in the middle of FIG. 2, when the geomagnetic sensor of the electronic device detects that the user turns 5° westward, it is determined that the first condition is met (namely, the deflecting direction does not exceed 5°); and then it is decided that a display pattern of the compass icon is determined in the first mode. That is to say, the mode with low computation complexity is adopted. It is determined that the pointer position of the compass turns 5° leftward to serve as the display position of the compass according to the pointer position of the compass calculated before and the current deflection data (i.e., 5° westward) detected by the geomagnetic sensor; and the message "current orientation: 5° north by west" is correspondingly displayed.

In addition, as shown in the right side of FIG. 2, when the geomagnetic sensor of the electronic device detects that the user turns 30° to west, it is determined that the first condition is not met at this time (namely, the deflecting direction exceeds) 5°, then it is decided that the display pattern of the compass icon is determined in the second mode. That is to say, the mode with high computation complexity is adopted. That is, it is re-determined that the pointer position of the compass turns 30° leftward to serve as the display position of the compass according to current deflection data (30° westward) detected by the geomagnetic sensor, and the message "current orientation: 30° north by west" is correspondingly displayed.

Figure 3:
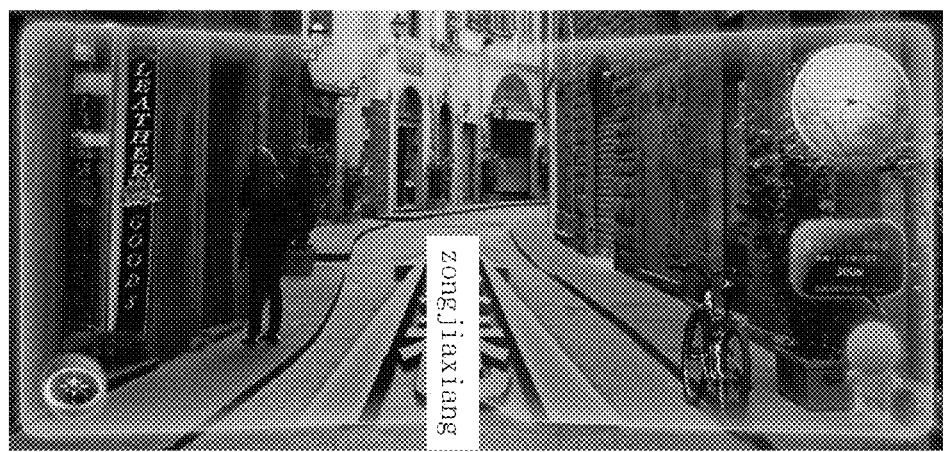
FIG. 3 is a second example illustrating the effect drawing of the display method according to the first embodiment of the present invention.

FIG. 3 is another effect drawing illustrating the display position of the display information on the display unit.

As shown in FIG. 3, image data on the front portion of the user's electronic device is obtained via a camera of the electronic device, and is displayed on the display unit.

On the other hand, when the application is initiated for the first time, it is determined that the first condition is not met. At this time, for example, by performing an image recognition processing on the image, a position in the middle of the road is recognized to serve as the position for displaying the first display information. Then, an arrow icon pointing to the destination "Zongjiaxiang" is displayed in the middle of the road.

On the other hand, a compass icon indicating a direction, an navigation route icon, and information for indicating the destination can also be displayed on the image in an overlapping manner.

For example, the display position and variation of the compass icon can be determined in a mode similar to FIG. 2.

In addition, the map data of the current position can be obtained by using the position information of the user obtained by the GPS sensor; the map data is displayed on the image; and the arrow and the like for indicating the advancing path of the user is displayed in the map data.

In addition, when one or more of the moving distance, orientation and dip angle of the user exceed the respective predetermined threshold value, it is decided that the display position of the display information is determined in the second mode.

For example, when the moving distance of the user exceeds the predetermined threshold value, the road shown at the current position of the user is different from the road previously at the previous position of the user, in which case the displayed arrow icon pointing to the destination "Zongjiaxiang" is incorrect, so the image needs to be recognized again according to the previous display position and the latest position information obtained by the GPS sensor, and the display position of the arrow icon pointing to the destination "Zongjiaxiang" is re-determined.

Thus, the display method according to the embodiment of the invention can select different modes to be used to determine the display position of the display information according to the using state of the user so as to improve the user experience.

<Second Embodiment>

Figure 4:
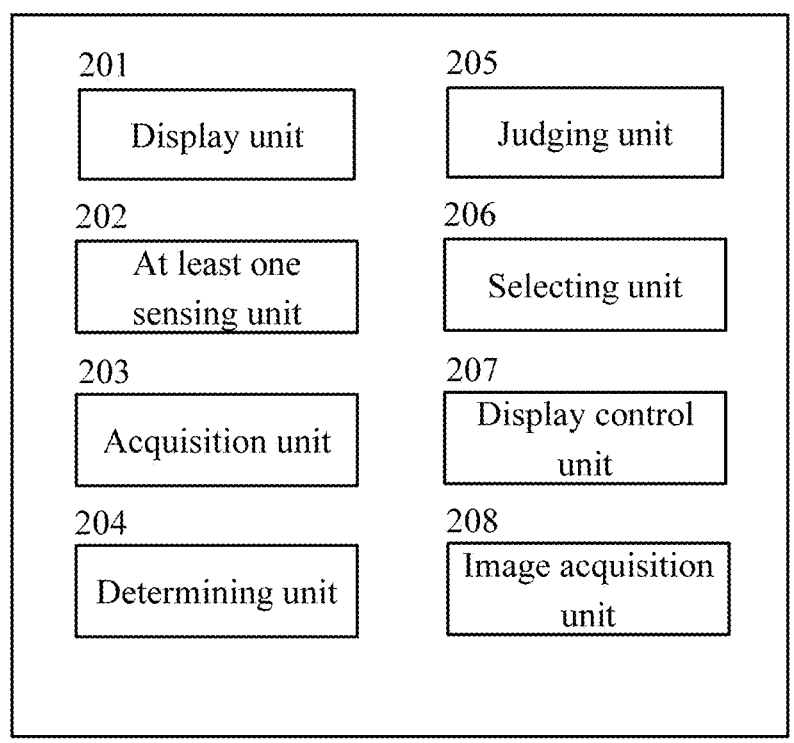
FIG. 4 is a block diagram illustrating a functional configuration of an electronic device according to a second embodiment of the present invention.

An electronic device according to the second embodiment of the present invention will be described now with reference to FIG. 4.

The electronic device 200 can be any electronic device, such as a smart phone, a tablet PC, a personal digital assistant (PDA), etc.

The electronic device 200 comprises:

A display unit 201;

At least one sensing unit 202;

An acquisition unit 203, for acquiring first sensing data by a first sensing unit in the at least one sensing unit;

A determining unit 204, for determining first display information according to the first sensing data;

A judging unit 205, for judging whether a predetermined condition is met or not to obtain a judgment result;

A selecting unit 206, for selecting a first mode or a second mode to be used to determine a display position of the first display information on the display unit according to the judgment result, the first mode being different from the second mode; and A display control unit 207, for controlling to display the first display information at the display position.

The display unit 201 can be any display device, such as a liquid crystal display (LCD), a light-emitting diode display (LED), an electro-luminescent display (OLED), etc.

For example, at least one sensing unit 202, for example, comprises a GPS sensor, a geomagnetic sensor, etc.

The selecting unit 206 is further used for: determining the display position of the first display information on the display unit 201 in the first mode, when the first condition is met; and determining the display position of the first display information on the display unit 201 in the second mode, when the first condition is not met.

The first condition includes that a variation of each sensing data obtained by the second sensing unit in the at least one sensing unit does not exceed a respective predetermined threshold value.

The first condition includes that the display position of the first display information on the display unit is not determined for the first time; or the first condition includes that a time period from the last time for determining the display position of the first display information on the display unit in the second mode does not exceed a predetermined time period.

The selecting unit 206 is further used for: determining the display position of the first display information on the display unit in the first mode, when the first condition is met; determining the display position of the first display information on the display unit in the second mode, when the second condition is met; and determining the display position of the first display information on the display unit in the second mode, when the first condition and the second condition are met at the same time.

In one embodiment, the first condition includes that a variation of each sensing data obtained by the at least one sensing unit does not exceed a respective predetermined threshold value; and the second condition includes that the time period from the last time for determining the display position of the first display information on the display unit in the second mode exceeds the predetermined time period.

In another embodiment, the first condition includes that the time period from the last time for determining the display position of the first display information on the display unit in the second mode does not exceed the predetermined time period; and the second condition includes that a variation of each sensing data obtained by the second sensing unit in the at least one sensing unit exceeds the respective predetermined threshold value.

The selecting unit 206 is further used for processing first initial data to obtain the display position of the first display information on the display unit, wherein the first initial data includes display position data of the first display information and each sensing data obtained by the second sensing unit in the at least one sensing unit. In addition, the selecting unit 206 is further used for processing second initial data to obtain the display position of the first display information on the display unit, wherein the second initial data is data not including the display position data of the first display information.

The selecting unit 206 is further used for determining the display position of the first display information on the display unit according to a current display position of the first display information and one or more sensing data obtained by the second sensing unit in the at least one sensing unit. In addition, the selecting unit 206 is further used for determining the display position of the first display information on the display unit according to the sensing data exceeding to the predetermined threshold value in the sensing data obtained by the second sensing unit in the at least one sensing unit.

In addition, the electronic device 200 comprises an image acquisition unit 208; after the first display information is displayed at the display position, the second display information is obtained by the image acquisition unit 208, and is displayed on the display unit.

The selecting unit 206 is further used for performing an image recognition processing on the second display information, and directly determining the display position of the first display information on the display unit 201 according to a result of the image recognition processing.

The first sensing unit is a spatial parameter sensor; and the first sensing data obtained by the first sensing unit is sensing data regarding a spatial parameter of the electronic device.

The judging unit 205 judges whether second sensing data obtained by the second sensing unit in the at least one sensing unit meets the predetermined condition or not to obtain the judgment result.

The first sensing data includes geographic position data and attitude data of the electronic device; and the attitude data includes an orientation and a dip angle of the electronic device.

The selecting unit 206 is further used for selecting the first mode or the second mode to be used to determine the display position of the first display information on the display unit by using the second sensing data, according to the judgment result.

Thus, the electronic device according to the embodiment of the present invention can select different modes to be used to determine the display position of the display information according to the using state of the user so as to improve the user experience.

It should be noted that the above embodiments are used as examples only; and the present invention is not limited thereto, and various modifications can be conducted to the embodiments.

It's important to note that the terms "include", "comprise" or other variations are intended to cover non-exclusive inclusion, so that the process, method, article or device comprising a series of elements not only comprises such elements, but also comprises other elements not listed explicitly, or all inherent elements of the process, method, article or device. Without more limitations, the elements defined by the statement of "comprises a/an/one . . . " does not exclusive of other same elements in the process, method, article and device.

Finally, it should be explained that a series of processes above comprise the processes carried out according to the time sequence as described herein, and the processes carried out in parallel or separately, not in accordance with the time sequence.

Through the above description of the implementation modes, a person of ordinary skill in the art can clearly know that the present invention can be implemented by the software plus necessary hardware platform, of course, it can also be executed by the hardware totally. Based on such understanding, the contribution of the technical solution of the present invention to the background art can be partially or entirely embodied in the form of software product; the computer software product can be stored in the medium, such as ROM (read-only memory)/RAM (random-access memory), disk, CD-ROM and the like, including instructions, through which one computer device (it can be a personal computer, a server, or a network device, etc.) can execute the method described in each embodiment or some part of the embodiment.

The present invention is described above in detail, wherein the principle and implementation mode of the present invention are elaborated by special examples; and the above described embodiments are only used to help understanding the method and core thought of the present invention; at the same time, for a person of ordinary skill in the art, the actual implementation mode and application scope can be changed according to the concept of the present invention. In summary, the present specification shall not be construed as limitation to the present invention.

The invention claimed is:

1. A display method applied in an electronic device which includes a display unit and at least one sensing unit, the method comprising:
   obtaining first sensing data by a first sensing unit in the at least one sensing unit;
   determining first display information according to the first sensing data;
   judging whether a predetermined condition is met or not to obtain a judgment result;
   selecting a first mode or a second mode according to the judgment result, wherein complexity of the first mode is lower than complexity of the second mode;
   determining a display position of the first display information on the display unit in a selected mode, wherein the display position is a position in a real scene on which the first display information is superimposed; and
   displaying the first display information at the display position, wherein
   determining the display position of the first display information on the display unit in the first mode includes:
      determining the display position of the first display information on the display unit according to a current display position of first display information previously determined and displayed on the display unit and one or more of the sensing data obtained by a second sensing unit in the at least one sensing unit; and
   determining the display position of the first display information on the display unit in the second mode includes:
      determining the display position of the first display information on the display unit according to the sensing data exceeding a predetermined threshold value in the sensing data obtained by the second sensing unit in the at least one sensing unit, or performing an image recognition processing on a second display information obtained by an image acquisition unit, and directly determining the display position of the first display information on the display unit according to a result of the image recognition processing.

2. The method according to claim 1, wherein said selecting the first mode or the second mode to be used to determine a display position of the first display information on the display unit according to the judgment result comprises:
   determining the display position of the first display information on the display unit in the first mode, when a first condition is met; and
   determining the display position of the first display information on the display unit in the second mode, when the first condition is not met.

3. The method according to claim 2, wherein the first condition includes that a variation of each sensing data obtained by the second sensing unit in the at least one sensing unit does not exceed a respective predetermined threshold value.

4. The method according to claim 2, wherein the first condition includes that the display position of the first display information on the display unit is not determined for a first time; or the first condition includes that a time period from a last time for determining the display position of the first display information on the display unit in the second mode does not exceed a predetermined time period.

5. The method according to claim 1, wherein said selecting the first mode or the second mode to be used to determine the display position of the first display information on the display unit according to the judgment result comprises:
   determining the display position of the first display information on the display unit in the first mode, when a first condition is met;
   determining the display position of the first display information on the display unit in the second mode, when a second condition is met; and
   determining the display position of the first display information on the display unit in the second mode, when the first condition and the second condition are met at the same time.

6. The method according to claim 5, wherein the first condition includes that a variation of each sensing data obtained by a second sensing unit in the at least one sensing unit does not exceed a respective predetermined threshold value; and the second condition includes that a time period from the last time for determining the display position of the first display information on the display unit in the second mode exceeds a predetermined time period.

7. The method according to claim 5, wherein the first condition includes that a time period from the last time for determining the display position of the first display information on the display unit in the second mode does not exceed a predetermined time period; and the second condition includes that a variation of each sensing data obtained by a second sensing unit in the at least one sensing unit exceeds a respective predetermined threshold value.

8. The method according to claim 1, wherein the electronic device includes an image acquisition unit; and the method further comprises:
   obtaining second display information by the image acquisition unit after the first display information is displayed at the display position; and
   displaying the second display information on the display unit.

9. The method according to claim 1, wherein the first sensing unit is a spatial parameter sensor; the first sensing data obtained by the first sensing unit is sensing data regarding a spatial parameter of the electronic device; and wherein, said judging whether the predetermined condition is met or not to obtain a judgment result includes judging whether second sensing data obtained by a second sensing unit in the at least one sensing unit meets the predetermined condition or not to obtain the judgment result.

10. The method according to claim 9, wherein the first sensing data includes geographic position data and altitude data of the electronic device, the attitude data including an orientation and a dip angle of the electronic device; and wherein, said selecting the first mode or the second mode to be used to determine the display position of the first display information on the display unit according to the judgment result includes selecting the first mode or the second mode to be used to determine the display position of the first display information on the display unit by using the second sensing data, according to the judgment result.

11. The method according to claim 1, wherein the first mode is a mode with first complexity; the second mode is a mode with second complexity; and the first complexity is lower than the second complexity.

12. An electronic device comprising:
a display unit;
at least one sensing unit;
an acquisition unit, for acquiring first sensing data by a first sensing unit in the at least one sensing unit;
a determining unit, for determining first display information according to the first sensing data;
a judging unit, for judging whether a predetermined condition is met or not to obtain a judgment result;
a selecting unit, for selecting a first mode or a second mode according to the judgment result, wherein complexity of the first mode is lower than complexity of the second mode;
a position determining unit, for determining display position of the first display information on the display unit in the selected mode, wherein the display position is a position in a real scene on which the first display information is superimposed; and
a display control unit, for controlling the display unit to display the first display information at the display position,
wherein said determining the display position of the first display information on the display unit in the first mode includes:
determining the display position of the first display information on the display unit according to the current display position of first display information previously determined and displayed on the display unit and one or more of the sensing data obtained by a second sensing unit in the at least one sensing unit; and
said determining the display position of the first display information on the display unit in the second mode includes:
determining the display position of the first display information on the display unit according to the sensing data exceeding a predetermined threshold value in the sensing data obtained by the second sensing unit in the at least one sensing unit, or performing an image recognition processing on a second display information obtained by an image acquisition unit, and directly determining the display position of the first display information on the display unit according to a result of the image recognition processing.

13. The electronic device according to claim 12, wherein the predetermined condition includes that a variation of each sensing data obtained by a second sensing unit in the at least one sensing unit does not exceed a respective predetermined threshold value.

14. The electronic device according to claim 12, wherein the predetermined condition includes that the display position of the first display information on the display unit is not determined for a first time; or the predetermined condition includes that a time period from a last time for determining the display position of the first display information on the display unit in the second mode does not exceed a predetermined time period.

15. The electronic device according to claim 12, further comprising an image acquisition unit, for acquiring second display information wherein, the display control unit displays the second display information on the display unit after displaying the first display information at the display position.

* * * * *